United States Patent

[11] 3,576,989

[72] Inventor Sidney Schwartz
 Manhattan, N.Y. (375 West End Ave., New York, N.Y. 10024)
[21] Appl. No. 767,362
[22] Filed Oct. 14, 1968
[45] Patented May 4, 1971

[54] PURSE-SIZE FACE-ILLUMINATING FLASHLIGHT AND MIRROR
 3 Claims, 8 Drawing Figs.
[52] U.S. Cl. .................................................... 240/4.2, 240/6.45R
[51] Int. Cl. ................................................... F21v 33/00
[50] Field of Search .......................................... 240/4.2, 6.45

[56] References Cited
 UNITED STATES PATENTS
 2,574,292 11/1951 Rush ............................ 240/6.45
 2,580,258 12/1951 Tarasuk ........................ 240/6.45X
 2,789,207 4/1957 Novakovich .................. 240/4.2
 3,377,474 4/1968 Corinaldi ...................... 240/4.2
 2,678,995 5/1954 Miller .......................... 240/6.45

Primary Examiner—Samuel S. Matthews
Assistant Examiner—Richard L. Moses
Attorney—Barnett & Barnett ABSTRACT: A lady's handbag-size mirror is mounted in a molded plastic frame formed with a cavity extending diametrically behind the mirror containing a dry cell battery. A lightbulb extends from one end of the cavity beyond the periphery of the mirror and is adapted to project light beams to the face of a user looking into the mirror. A removable depressible button extends from the other end of the cavity for actuating a normally open switch to light the bulb and permits access to the cavity for changing the battery and bulb. The frame is formed in mating halves which meet substantially in a plane parallel to that of the mirror.

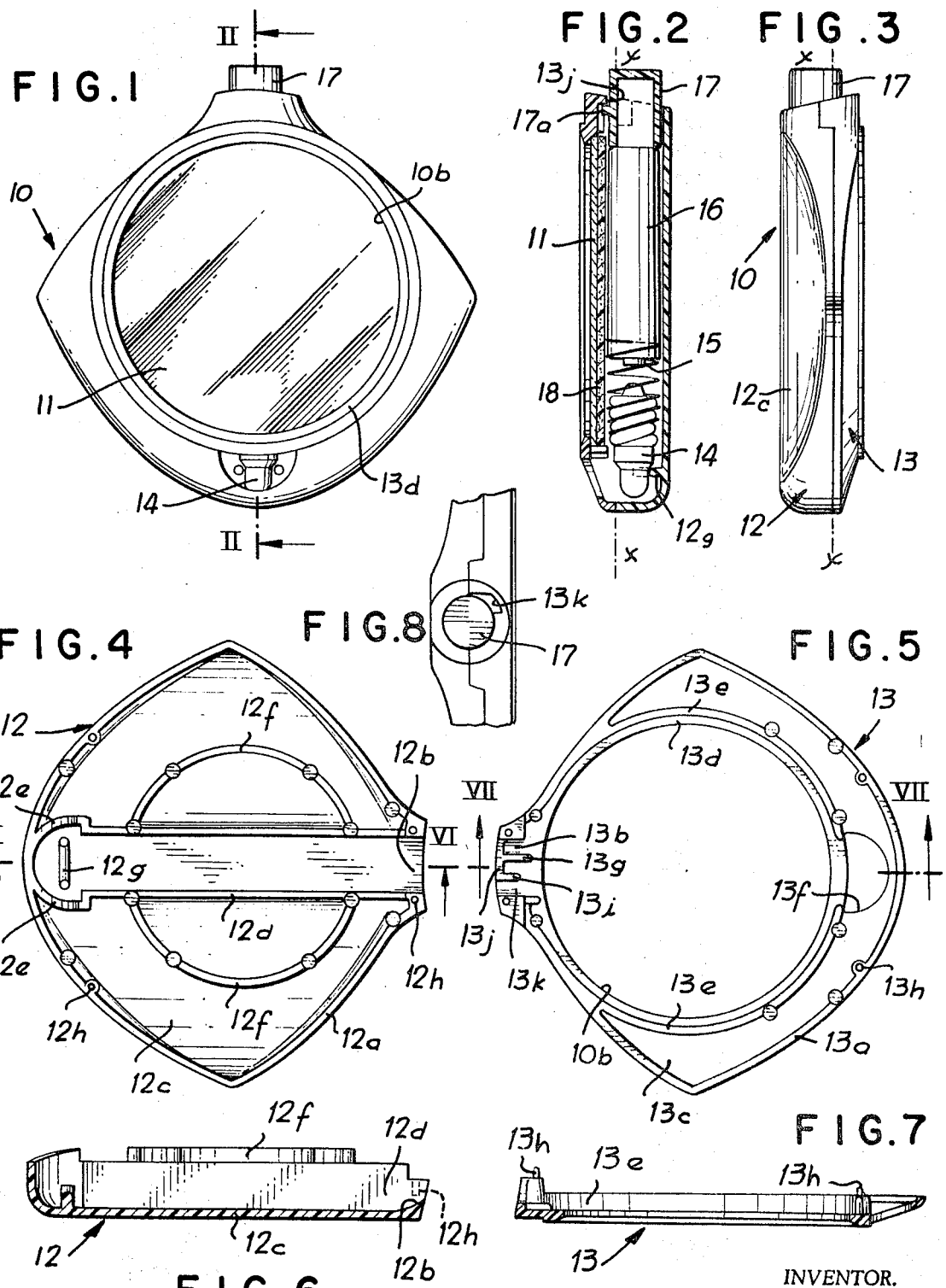

PURSE-SIZE FACE-ILLUMINATING FLASHLIGHT AND MIRROR

FIELD OF THE INVENTION

This invention relates to a mirror of handbag or purse size incorporating a flashlight, the bulb of which is located to project a beam of light to illuminate the face of a user looking into the mirror.

SUMMARY OF THE INVENTION

Among the objects of the invention is to generally improve and simplify the construction of mirror and flashlight units of the character described. The invention contemplates a device which shall comprise a novel arrangement of few and simple parts, some parts being standard and readily available and others, particularly the frame or mirror casing, moldable in relatively low cost quantity production of plastic resinous material. The parts are readily assembled with a minimum of skilled labor into a reliable mirror and flashlight unit which is rugged in construction, colorful and attractive in appearance, relatively small and compact for easy handling and fitting into a lady's purse or handbag, and convenient to operate by holding in the palm of one hand. A normally open press-to-light button switch is readily accessible for operation by one of the fingers of the holding hand, leaving the other hand entirely free for application of cosmetics or other desired manipulations, such as, holding a theatre program when using the flashlight for reading purposes. The novel arrangement of parts includes a plastic molded frame for the mirror which also serves as a casing for the flashlight. The frame is formed as rear and front mating members which are joined together after the mirror is inserted in position therebetween. The rear frame member has its depth increased along a diameter of the mirror to provide a chamber behind the mirror for housing the flashlight components. The chamber at one end extends beyond the periphery of the mirror and seats the light bulb in register with the opening in the front frame member through which light rays are directed substantially perpendicular to the surface of the mirror, that is, in a direction to illuminate the face of a user when looking into the mirror. The opposite end of the chamber is open for receiving the flashlight components therethrough and has its wall formed for the removable retention of the press-to-light switch button serving as a closure for the opening and projecting radially outwardly with respect to the periphery of the mirror and diametrically opposite the light bulb.

BRIEF DESCRIPTION OF THE DRAWING

FIG. 1 is a front elevational view of the face illuminating flashlight and mirror unit embodying the invention.

FIG. 2 is a vertical section taken on line II—II in FIG. 1 showing the arrangement and location of the light bulb, battery and switch which comprise the flashlight.

FIG. 3 is a side elevational view of the mirror unit as seen from the left in FIG. 1.

FIGS. 4 and 5 are interior plan views of the rear and front casing members, respectively, of the plastic molded frame separated and laid open, with the mirror, battery, light bulb and switch button removed.

FIGS. 6 and 7 are sections taken on lines VI—VI and VII—VII in FIGS. 4 and 5, respectively, and FIG. 8 is a fragmentary top plan view of the unit in FIG. 3 showing the switch button and entrance track for the bayonet type mounting.

DESCRIPTION OF THE PREFERRED EMBODIMENT

Referring in detail to the drawing, 10 denotes a face-illuminating flashlight and mirror unit constructed to embody the invention comprising a mirror 11 mounted between rear and front mating frame members 12 and 13, respectively. Rear frame member 12 is formed to contain a flashlight assembly comprising a light bulb 14, compression spring 15, battery 16 and switch button 17, located diametrically behind and arranged so that bulb 14 and button 17 project beyond the periphery of mirror 11.

Mating frame members 12, 13 and switch button 17 may be molded of a suitable plastic resin, such as, polystyrene, high impact styrene, linear polyethylene, and the like, in a wide variety of colors, to provide the functional parts herein described and shown in the drawing and any design features to enhance the attractiveness and appeal of unit 10 as a lady's handbag accessory.

Frame members 12 and 13 are generally dish-shaped, having opposite facing peripheral edges 12a and 13a, respectively, meeting in abutment substantially in a plane x—x space behind mirror 11. Rear frame member 12 has its deepest portion extending along a diameter thereof to provide a flashlight containing chamber 10a defined by a pair of spaced apart parallel, diametrically extending interior walls 12d upstanding from rear wall 12c. A pair of arcuate-shaped interior walls 12f are arranged in a circle on both sides of chamber 10a upstanding from rear wall 12c and extending forwardly beyond plane x—x forming a backing against which mirror 11 is supported.

Front frame member 13 has a large central opening 10b in front wall 13c exposing mirror 11 which is peripherally secured by a bezel ring 13d integrally formed to surround opening 10b and a pair of arcuate-shaped interior walls 13e upstanding from front wall 13c and extending rearwardly to plane x—x to surround the peripheral edge of mirror 11.

As is clear from FIGS. 2 and 4, flashlight containing chamber 10a has the light bulb end thereof slightly enlarged by interior walls 12d being offset from each other and terminating in arcuate portions 12e which merge with a forward extension of rear wall 12c, closing this end portion of chamber 10a except for semicircular opening 13f which is formed in front wall 13c outwardly of bezel ring 13d for projecting light beams therethrough to illuminate the face of the user. A cradle 12g upstanding from rear wall 12c is sized to seat and properly locate light bulb 14 is in the enlarged end of chamber 10a.

The opposite or switch button mounting end of chamber 10a is formed with a semicircular wall portion 12b of rear wall 12c which mates with a similar wall portion 13b of front frame wall 13c providing a cylindrical end opening through which switch button 17 projects. Semicircular walls 12b and 13b meet in a plane which substantially bisects chamber 10a, that is, in a plane offset rearwardly from plane x—x as shown in FIGS. 3, 6, 7 and 8. Switch button 17 is cylindrically shaped and may be molded with a hollow center which opens inwardly and a laterally extending pin 17a adapted to engage a track provided between longitudinally extending long and short parallel ribs 13g and 13i, respectively, on the interior surface of semicircular wall 13b and closed at the outer end thereof by a partially transverse edge flange 13j which terminates at short rib 13i so that an entrance track 13k for pin 17a is provided alongside short rib 13i as is clear from FIGS. 5 and 8. To facilitate joining frame members 12 and 13 together, suitable registering means may be provided, such as, alignment pins 13h upstanding from peripheral edge 13a and located to seat in registering pin bores 12h formed in edge 12a.

To accommodate variations in the thickness of commercially available mirrors and to insure a snug fit yet avoid undue stress which may crack the mirror, a sheet of cushioning material 18 may be interposed between the back of mirror 11 and the front-facing edges of interior walls 12f. Any suitable resilient and compressible material may be used, as for example, any of the foams made of polyurethane, polyethylene, polyvinyl, rubber or the like.

Assembly of unit 10 may be readily accomplished by placing mirror 11 and cushioning sheet 18 within the confines of arcuate interior walls 13e of front frame member 13. Rear frame member 12 is then brought into registered alignment so that locating pins 13h engage bores 12h and the front-facing surfaces of arcuate-shaped interior walls 12f are brought to bear against cushioning sheet 18. Frame members 12 and 13 are then bonded together along peripheral edges 12a and 13a by any suitable means, such as, by cementing, ultrasonic sealing and the like. The flashlight components may be preassembled with compression spring 15 serving both as a mechanical and electrical connection between the light bulb base terminal and the battery casing terminal and normally separating the bulb and battery center terminals in an open switch position as is clear from FIG. 2. The flashlight assembly is then inserted into flashlight chamber 10a through the end opening thereof so that light bulb 14 seats in cradle 12g and positions the battery 16 for engagement by switch button 17 when inserted into the chamber end opening in bayonet-seat fashion, that is, by aligning button 17 so that pin 17a slides through entrance track 13k, depressing button 17 to insure clearance of short rib 13i by pin 17a, and rotating button 17 in a clockwise direction as seen in FIG. 8 until pin 17a engages long rib 13g wherein it is positioned for axial movement along the confined track between long rib 13g and short rib 13i.

In use, face-illuminating flashlight and mirror unit 10 may be held in the palm of one hand, orientated as shown in FIG. 1 so that the index finger is in operative contact with switch button 17. Upon depression the latter, battery 16 is forced downwardly against the action of compression spring 15 bringing the center terminals of the bulb 14 and battery 16 into electrical contact to close the circuit and light bulb 14 which is positioned, with the aid of the reflecting surfaces of the surrounding walls thereof, to project light beams to illuminate the face of a user when looking at himself in mirror 11. Upon release, battery 16 is forced upwardly by compression spring 15, opening the circuit and returning switch button 17 to its fully extended position wherein pin 17a engages transverse edge flange 13j as shown in FIG. 2.

To replace battery 16 and/or light bulb 14, switch button 17 is fully depressed as in lighting bulb 14 and then rotated through about 30° of arc in a counterclockwise direction as seen in FIG. 8 so that pin 17a clears short rib 13i for withdrawal through entrance track 13k permitting removal of switch button 17. Upon inverting unit 10, the flashlight assembly will readily slide out of chamber 10a and after servicing the parts are reassembled as hereinbefore described.

The purse size face-illuminating flashlight and mirror herein disclosed is seen to achieve the several objects of the invention and to be well adapted to meet conditions of practical use. As various possible embodiments might be made in this invention, and as various changes might be made in the disclosed construction, it is to be understood that all matter herein set forth or shown in the accompanying drawing are to be interpreted as illustrative and not in a limiting sense.

I claim:

1. A face-illuminating flashlight and mirror unit comprising a purse-size mirror secured in a frame comprising front and rear mating members joined together substantially in a plane parallel to and behind the plane of said mirror, said front member having a large central opening in which said mirror is secured against forward movement by an integrally formed bezel ring and against planar movement by interior wall sections extending about portions of the periphery of the mirror, said rear frame member having a rear wall from which diametrically extend behind the mirror a pair of spaced parallel walls defining opposite sidewalls of a chamber, a pair of arcuate walls, one spaced on either side of said chamber, upstanding from said rear wall and projecting forwardly beyond the plane of said joint of the mating members forming a backing against rearward movement of the mirror, a flashlight assembly located in said chamber and having a light bulb extending beyond the periphery of the mirror, said front frame member having a further opening adjacent said light bulb, and a switch button, spring biased in a normally open extended position, projecting from an open end of said chamber beyond the periphery of the mirror diametrically opposite said light bulb, said light bulb, mirror, frame and switch button being constructed and arranged to project a light beam through said further opening with said front and rear members in assembled relation to illuminate the face of a user when looking in the mirror on depression of the switch button to light said bulb.

2. The flashlight and mirror unit defined in claim 1 in which said flashlight assembly comprises said light bulb and penlite battery connected together in axial alignment by a compression spring providing an electrical circuit between the light bulb base terminal and the battery casing terminal, said spring resiliently separating the light bulb and battery center terminals and serving as said spring biasing of the switch button.

3. The flashlight and mirror unit defined in claim 2 in which said switch button is removably seated in bayonet fashion in said chamber open end for removal and replacement of parts of said flashlight assembly.